United States Patent
Tseng et al.

(10) Patent No.: US 9,233,691 B2
(45) Date of Patent: Jan. 12, 2016

(54) POWER DISTRIBUTION METHOD FOR ELECTRIC VEHICLE DRIVEN BY TWO POWER SOURCES

(71) Applicant: Chyuan-Yow Tseng, Pingtung County (TW)

(72) Inventors: Chyuan-Yow Tseng, Pingtung County (TW); Han-Wei Tang, Kedah (MY); Bo-Peng Li, Pingtung County (TW)

(73) Assignee: Chyuan-Yow Tseng, Pingtung County (TW)

( * ) Notice: Subject to any disclaimer, the term of this patent is extended or adjusted under 35 U.S.C. 154(b) by 0 days.

(21) Appl. No.: 14/461,473

(22) Filed: Aug. 18, 2014

(65) Prior Publication Data

US 2015/0057866 A1    Feb. 26, 2015

(30) Foreign Application Priority Data

Aug. 23, 2013 (TW) .............................. 102130326 U

(51) Int. Cl.
B60W 30/188 (2012.01)
B60W 10/08 (2006.01)
B60W 10/10 (2012.01)
B60K 1/02 (2006.01)

(52) U.S. Cl.
CPC ............... *B60W 30/188* (2013.01); *B60K 1/02* (2013.01); *B60W 10/08* (2013.01); *B60W 10/10* (2013.01)

(58) Field of Classification Search
None
See application file for complete search history.

(56) References Cited

U.S. PATENT DOCUMENTS

| | | | | |
|---|---|---|---|---|
| 5,484,350 A * | 1/1996 | Ishikawa | ............. | F16H 61/0213 477/120 |
| 6,364,806 B1 * | 4/2002 | Spaniel | ..................... | B60K 1/02 180/65.7 |
| 7,090,612 B2 * | 8/2006 | Ozeki | .................... | B60K 6/365 477/3 |
| 7,343,993 B2 * | 3/2008 | Dong | ..................... | B60K 6/387 180/65.23 |
| 7,967,090 B2 * | 6/2011 | Atarashi | ................ | B60K 6/445 180/65.21 |
| 8,303,467 B2 * | 11/2012 | Iwase | ..................... | B60K 6/445 180/65.265 |
| 2004/0192494 A1 * | 9/2004 | Ozeki | .................... | B60K 6/365 477/3 |
| 2005/0218718 A1 * | 10/2005 | Iwatsuki | ............... | B60T 8/1766 303/177 |
| 2006/0113127 A1 * | 6/2006 | Dong | ..................... | B60K 6/387 180/65.1 |
| 2007/0137906 A1 * | 6/2007 | Seminara | ............... | B60K 6/442 180/65.1 |
| 2008/0314658 A1 * | 12/2008 | Atarashi | ................ | B60K 6/445 180/65.25 |
| 2009/0082154 A1 * | 3/2009 | Iwase | ..................... | B60K 6/445 475/150 |

FOREIGN PATENT DOCUMENTS

TW        1428247 B       3/2014

* cited by examiner

*Primary Examiner* — Calvin Cheung
*Assistant Examiner* — Krishnan Ramesh
(74) *Attorney, Agent, or Firm* — Alan D. Kamrath; Kamrath IP Lawfirm, P.A.

(57) ABSTRACT

A power distribution method for electric vehicle driven by two power sources includes executing a first power distribution law by a vehicle control unit, wherein the first power distribution law sets a distribution ratio according to a vehicle speed of the electric vehicle, a torque demand, and a current gear of a transmission. The powers outputted by first and second motors are adjusted according to the distribution ratio such that the first and second motors can operate at the most efficient operation points to increase the operational efficiency of the electric vehicle driven by two power sources.

20 Claims, 11 Drawing Sheets

POWER DISTRIBUTION METHOD FOR ELECTRIC VEHICLE DRIVEN BY TWO POWER SOURCES

BACKGROUND OF THE INVENTION

1. Field of the Invention

The present invention relates to a driving method for an electric vehicle and, more particularly, to a power distribution method for an electric vehicle driven by two power sources.

2. Description of the Related Art

Vehicles in the current market used to consume fuels as the main power source. Responsive to the global oil shortage, extensive researches in substitute energy vehicles and hybrid vehicles have been made in industries with an intention to minimize the adverse effect of the oil shortage on the vehicle markets. Every car company actively tried to replace oil with electricity as the power sources for vehicles and developed various electric vehicles and various hybrid vehicles to gradually get rid of reliance of oil, and electricity has been a successful power source and gains a role in the market.

Conforming to this trend the electric vehicle industry develops flourishingly, but thus, many technical problems occurred. The problems should be solved in electric vehicles driven by motors significantly different from conventional vehicles driven by internal combustion engines. For electric vehicles, a transmission is required for the electric motor to output an extremely high torque while the vehicle moves at a low speed and to obtain an extremely high rotating speed while the vehicle moves at a high speed. Nevertheless, the transmission must have high efficiency and low costs to provide the product with high competitiveness on the market.

Conventional transmissions for electric vehicles include continuously variable transmissions (CVT), manual transmissions (MT), and automated manual transmissions (AMT). Continuously variable transmissions have low transmission efficiency due to slips during gear shifting processes. Manual transmissions having the highest transmission efficiency but tire the drivers and are inconvenient in use. Thus, automated manual transmissions are a better option. However, automated manual transmissions are expensive and, when a limited number of gears are provided, may result in uncomfortable feel to the drivers due to torque holes during gear shifting processes.

With reference to FIG. 1, to solve the above disadvantages, Taiwan Patent Publication No. 201242804 entitled "Device of twin source power for electric vehicle" discloses an electric vehicle 1 driven by two power sources. The electric vehicle 1 includes a first motor 11, a second motor 12, and a transmission 13. The transmission 13 is a clutchless automatic manual transmission (CLAMT). The power of the first motor 11 is directly transmitted to a transmission shaft 14. The power of the second motor 12 is transmitted to the transmission shaft 14 after gear shifting by the transmission 13. The power received by the transmission shaft 14 is a sum of the powers outputted by the first and second motors 11 and 12. The total power demanded by the electric vehicle 1 is shared by the first and second motors 11 and 12. The transmission 13 includes an automatic gear shifting mechanism. Electronic synchronization is firstly executed when a vehicle control unit 15 (VCU) gives a gear shifting command, and a motor driver 121 of the second motor 12 controls the rotating speed of the second motor 12 such that the driving gear and the driven gear of the transmission 13 rotate synchronously. A gear shifting driver 131 drives a gear shifting actuator 132 to actuate the automatic gear shifting mechanism for automatically changing the gear.

Since the electric vehicle 1 includes an electronic synchronization function, the transmission 13 does not require a conventional clutch device, significantly saving the costs and the space for installation. Furthermore, the first motor 11 shares a portion of the power and, thus, can increase the output power when the second motor 12 does not output power during the gear shifting process. The torque hole of the second motor 12 is compensated to provide a smooth vehicle power output during the gear shifting process, increasing driving comfort.

According to the regulations to electric vehicles in many countries, the total power of the power sources of micro electric vehicles and low speed electric vehicles must be lower than 4 KW. Nevertheless, multi-seat electric vehicles meeting the regulations must be able to travel on various grades under a heavy load and able to travel on a level road at a maximum speed of at least 45 km/hr. Thus, under the limitation of total power of the electric vehicle 1, distribution of the power outputs of the first and second motors 11 and 12 of the electric vehicle 1 for operating the first and second motors 11 and 12 at the most efficient operation points and making the transmission 13 select a proper gear according to actual load conditions for satisfying driver's demand and reducing energy consumption are difficult issues to be solved.

Thus, a need exists for a power distribution method for an electric vehicle driven by two power sources to properly arrange the power output of each power source of a conventional electric vehicle driven by two power sources such that each power source can be operated at the most efficient operation point to effectively increase the operational efficiency of the conventional electric vehicle driven by two power sources and, at the same time, to control the gear of the transmission according to the vehicle load so as to provide a high torque output at low speeds while meeting the extreme speed requirement under limited power of the power sources, increasing the climbing performance, load capacity, operational convenience, and driving comfort of the electric vehicle having a limited total power.

SUMMARY OF THE INVENTION

An objective of the present invention is to provide a power distribution method for an electric vehicle driven by two power sources to execute a first power distribution law by a vehicle control unit. The first power distribution law sets a distribution ratio according to a vehicle speed of the electric vehicle, a torque demand, and a current gear of a transmission. The powers outputted by first and second motors are adjusted according to the distribution ratio such that the first and second motors can operate at the most efficient operation points to increase the operational efficiency of the electric vehicle driven by two power sources.

Another objective of the present invention is to provide a power distribution method for an electric vehicle driven by two power sources, wherein the vehicle control unit uses a vehicle load estimation algorithm to calculate a driving resistance to the electric vehicle, and a shifting map is selected according to the driving resistance. The shifting map, the vehicle speed, and an accelerator signal are used to identify the target gear of a transmission of the second motor, maintaining the transmission in the optimal gear such that the second motor can continuously operate at the best efficiency to output an optimal power, reducing the energy consumed by the electric vehicle and increasing operational convenience.

A further objective of the present invention is to provide a power distribution method for an electric vehicle driven by two power sources, wherein the power is distributed according to a second power distribution law before gear shifting of the transmission. The first power provides the total power demanded by the electric vehicle to assure the electric vehicle will not have any torque hole during the gear shifting process, maintaining the vehicle speed and ensuring gear shifting smoothness. Furthermore, the vehicle control unit will carry out an electronic synchronization process to rapidly reduce the rotating speed error between the second motor and the target gear to a specific range, effectively shortening the time required for gear shifting to increase the gear shifting quality, such that the electric vehicle has a smooth power output during the gear shifting process, increasing driving comfort.

The present invention fulfills the above objectives by providing a power distribution method for an electric vehicle driven by two power sources. The power distribution method includes driving a first motor and a second motor to run respectively by a vehicle control unit, with the first and second motors simultaneously outputting powers to a transmission shaft of the electric vehicle driven by the first and second motors; receiving a vehicle speed signal indicative of a vehicle speed of the electric vehicle and an accelerator signal with the vehicle control unit; calculating a torque demand of the electric vehicle based on the vehicle speed and the accelerator signal; deciding a power demand of the electric vehicle based on the torque demand; executing a first power distribution law to extract a distribution ratio from a distribution ratio database based on the vehicle speed, a current gear of a transmission connected to the second motor, and the power demand; adjusting a ratio of a power outputted from the first motor to a power outputted from the second motor according to the distribution ratio; calculating a driving resistance to the electric vehicle with the vehicle control unit by using a vehicle load estimation algorithm; selecting a shifting map out of a plurality of shifting maps according to the driving resistance; identifying a target gear of the transmission based on the selected shifting map, the vehicle speed, and the accelerator signal; and judging whether the target gear is equal to the current gear of the transmission with the vehicle control unit, with the vehicle control unit keeping executing the first power distribution law and maintaining the target gear of the transmission if the target gear is equal to the current gear, and with the vehicle control unit using a gear shifting driver to shift the current gear of the transmission to the target gear if the target gear is different from the current gear.

In the power distribution method for an electric vehicle driven by two power sources according to the present invention, the vehicle control unit uses the accelerator signal to decide the torque demand of the electric vehicle based on an expression showing a relationship between the torque demand and the accelerator signal as follows:

$$T_d = f(\alpha) \times T_{max}(V)$$

wherein $T_d$ is the torque demand, $\alpha$ is the accelerator signal, V is the vehicle speed, $f(\alpha)$ is a polynomial function of the accelerator signal $\alpha$ and is in a range between 0 and 1, $T_{max}(V)$ is a maximum torque output of the electric vehicle correponding to the vehicle speed.

In the power distribution method for an electric vehicle driven by two power sources according to the present invention, the power demand calculated from the torque demand is as follows:

$$P_d = T_d \times \omega_w$$

wherein $P_d$ is the power demand, $T_d$ is the torque demand, $\omega_w$ is a rotating speed of a driving wheel of the electric vehicle obtained from the vehicle speed.

In the power distribution method for an electric vehicle driven by two power sources according to the present invention, a relationship between the power demand and the powers outputted from the first and second motors is as follows:

$$P_d = P_{M1} + P_{M2}$$

wherein $P_d$ is the power demand of the electric vehicle, $P_{M1}$ is the output power of the first motor, and $P_{M2}$ is the output power of the second motor.

In the power distribution method for an electric vehicle driven by two power sources according to the present invention, the first power distribution law is as follows:

$$P_{M1} = a \times P_d, \ P_{M2} = (1-a) \times P_d$$

wherein $P_d$ is the power demand, $P_{M1}$ is the output power of the first motor, $P_{M2}$ is the output power of the second motor, a is the distribution ratio and is in a range between 0 and 1.

In the power distribution method for an electric vehicle driven by two power sources according to the present invention, the output powers of the first and second motors are as follows:

$$P_{M1} = T_{M1} \times \omega_1, \ P_{M2} = T_{M2} \times \omega_2$$

wherein $P_{M1}$ is the output power of the first motor, $P_{M2}$ is the output power of the second motor, $T_{M1}$ is the output torque of the first motor, $T_{M2}$ is the output torque of the second motor, $\omega_1$ is a rotating speed of the first motor obtained from the vehicle speed, and $\omega_2$ is a rotating speed of the second motor obtained from the vehicle speed.

In the power distribution method for an electric vehicle driven by two power sources according to the present invention, a total power consumed by the first and second motors is as follows:

$$P_{consum} = T_{M1} \times \omega_1 / \eta_{M1} + T_{M2} \times \omega_2 / \eta_{M2}$$

wherein $P_{consum}$ is the total power, $T_{M1}$ is the output torque of the first motor, $T_{M2}$ is the output torque of the second motor, $\omega_1$ is the rotating speed of the first motor, $\omega_2$ is the rotating speed of the second motor, $\eta_{M1}$ is an operational efficiency at an operation point where the first motor has the output torque $T_{M1}$ and the rotating speed $\omega_1$, and $\eta_{M2}$ is an operational efficiency at an operation point where the second motor has the output torque $T_{M2}$ and the rotating speed $\omega_2$.

In the power distribution method for an electric vehicle driven by two power sources according to the present invention, data of distribution ratios for minimizing the total power according to different vehicle speeds, every gear of the transmission, and different power demands is obtained in advance and stored in the vehicle control unit to construct the distribution ratio database.

In the power distribution method for an electric vehicle driven by two power sources according to the present invention, when the electric vehicle starts to accelerate from a still state, the distribution ratio increases as the vehicle speed increases.

In the power distribution method for an electric vehicle driven by two power sources according to the present invention, when the vehicle speed is zero, the power of the electric vehicle is completely supplied by the second motor such that the distribution ratio is zero, and the distribution ratio increases as the vehicle speed increases, gradually increasing a proportion of the power outputted from the first motor.

In the power distribution method for an electric vehicle driven by two power sources according to the present invention, the driving resistance calculated by using the vehicle load estimation algorithm includes rolling resistance, drag resistance, and gradient resistance and is expressed as follows:

$$L = \mu mg \ \cos\theta + \frac{1}{2}\rho A C_d V^2 + mg \ \sin\theta$$

wherein m is the mass of the electric vehicle, μ is a rolling resistance coefficient and is assumed as a constant, g is a gravitational acceleration, θ is a grade of a road on which the electric vehicle moves, ρ is an air density, A is a frontal area of the electric vehicle, and $C_d$ is a drag resistance coefficient.

In the power distribution method for an electric vehicle driven by two power sources according to the present invention, a relationship between the acceleration of the electric vehicle, a tractive force imparted to the driving wheel of the electric vehicle, and the driving resistance is expressed as follows:

$$\dot{V} = (F_t - F_a)\frac{1}{m} - g\sqrt{1+\mu^2} \ \sin(\theta + \psi)$$
$$= [F_t - F_a - g\sqrt{1+\mu^2}]\begin{bmatrix} 1/m \\ \sin(\theta + \psi) \end{bmatrix}$$

wherein $\dot{V}$ is the acceleration, $F_t$ is the tractive force, $$F_a = \frac{1}{2}\rho A C_d V^2, \quad \psi = \sin^{-1}\left(\frac{\mu}{\sqrt{1+\mu^2}}\right),$$

the mass of the electric vehicle and the grade of the road on which the electric vehicle moves are estimated by using an algorithm on the above expression and are used to calculate the driving resistance.

In the power distribution method for an electric vehicle driven by two power sources according to the present invention, the algorithm is a recursive least-square error method (RLSE).

In the power distribution method for an electric vehicle driven by two power sources according to the present invention, the vehicle control unit divides driving resistances on different grades into a plurality of load ranges according to a change in the vehicle speed, and driving forces outputted from the second motor at different gears of the transmission are used to design the shifting map in each of the plurality of load ranges.

In the power distribution method for an electric vehicle driven by two power sources according to the present invention, the shifting map is a table cross referencing the vehicle speed and the torque demand of the electric vehicle to the target gear of the transmission.

In the power distribution method for an electric vehicle driven by two power sources according to the present invention, after the vehicle control unit obtains the driving resistance to the electric vehicle based on the vehicle load estimation algorithm, a corresponding shifting map is selected according to a corresponding load range to which the driving resistance belongs.

In the power distribution method for an electric vehicle driven by two power sources according to the present invention, the vehicle control unit shifts the gear of the transmission according to a second power distribution law to distribute the power, and the first motor supplies the electric vehicle with the torque demand.

In the power distribution method for an electric vehicle driven by two power sources according to the present invention, the power demand of the electric vehicle is adjusted to be completely supplied by the first motor according to the second power distribution law and is expressed as follows:

$$P_{M1}=P_d, P_{M2}=0$$

wherein $P_d$ is the power demand of the electric vehicle, $P_{M1}$ is the output power of the first motor, and $P_{M2}$ is the output power of the second motor.

In the power distribution method for an electric vehicle driven by two power sources according to the present invention, after the second power distribution law is executed by the vehicle control unit, a gear shifting actuator is driven via the gear shifting driver to shift the current gear of the transmission into a neutral gear, and an electronic synchronization process is carried out to change the rotating speed of the second motor to a target rotating speed, and the gear shifting actuator is then driven via the gear shifting driver to shift the transmission to the target gear.

In the power distribution method for an electric vehicle driven by two power sources according to the present invention, the electronic synchronization process includes conversion of the rotating speed of the first motor into the target rotating speed based on a ratio of a first gear ratio at which the first motor transmits power to the transmission shaft to a second gear ratio at which the second motor transmits power to the transmission shaft via the transmission and includes adjustment of the rotating speed of the second motor to the target rotating speed by the vehicle control unit.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

A power distribution method according to the present invention can be

Figure 1:
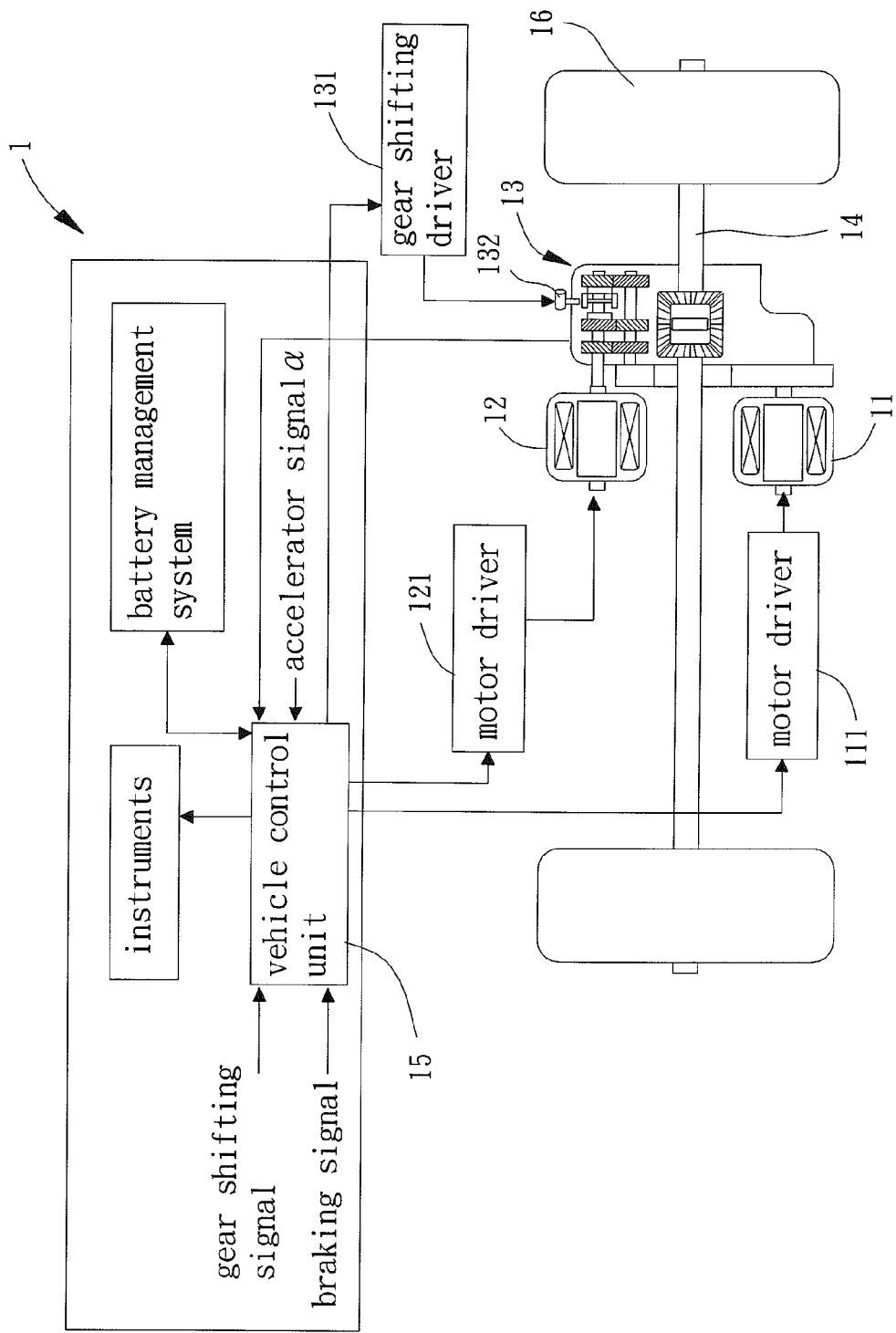
FIG. 1 is a schematic diagram of a conventional electric vehicle driven by two power sources.

A power distribution method according to the present invention can be used on the electric vehicle 1 driven by two power sources shown in FIG. 1. The electric vehicle 1 is driven by first and second motors 1 and 2. The second motor 12 is connected to a transmission 13 such as an automatic transmission. In this embodiment, the transmission 13 is a clutchless automatic transmission having a first gear G1, a second gear G2, and a third gear G3. However, other forms of transmissions can be used. Furthermore, the power distribution method can be used on hybrid vehicles or other forms of electric vehicles driven by two power sources.

Figure 2:
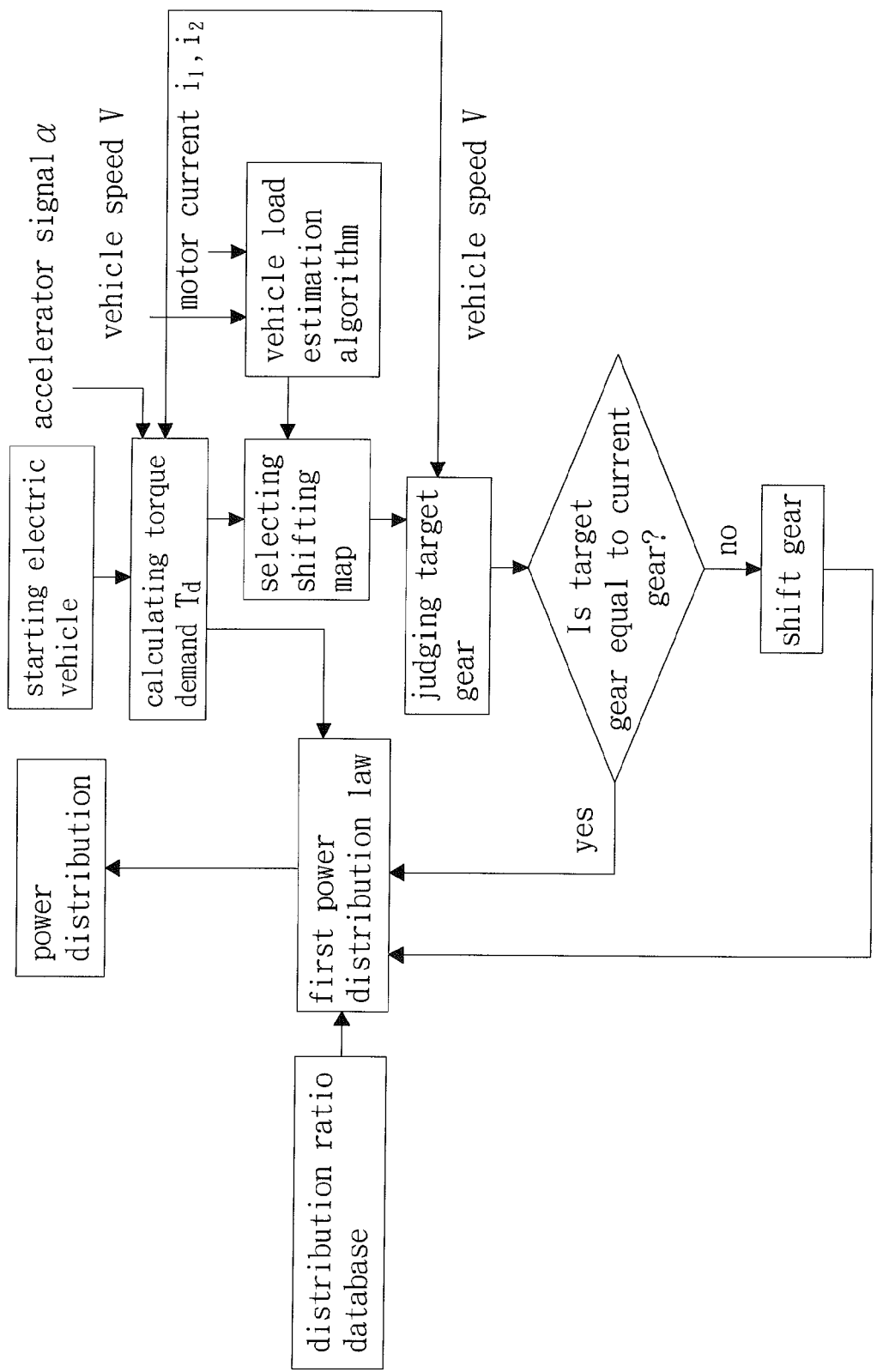
FIG. 2 is a flowchart illustrating an example of a power distribution method for an electric vehicle driven by two power sources according to the present invention.

FIG. 2 is a flowchart illustrating an example of the power distribution method for an electric vehicle driven by two power sources according to the present invention. After the electric vehicle 1 is started and enters a driving mode, a vehicle control unit 15 drives the first motor 11 via a motor driver 111 and drives the second motor 12 via another motor driver 121 such that the first and second motors 12 simultaneously output powers to a transmission shaft 14 of the electric vehicle 1. At the same time, the vehicle control unit 15 receives a vehicle speed signal indicative of a vehicle speed V of the electric vehicle 1 and instantly adjusts a ratio of the power outputted from the first motor 11 to the power outputted from the second motor 12 based on the vehicle speed V.

Figure 3:
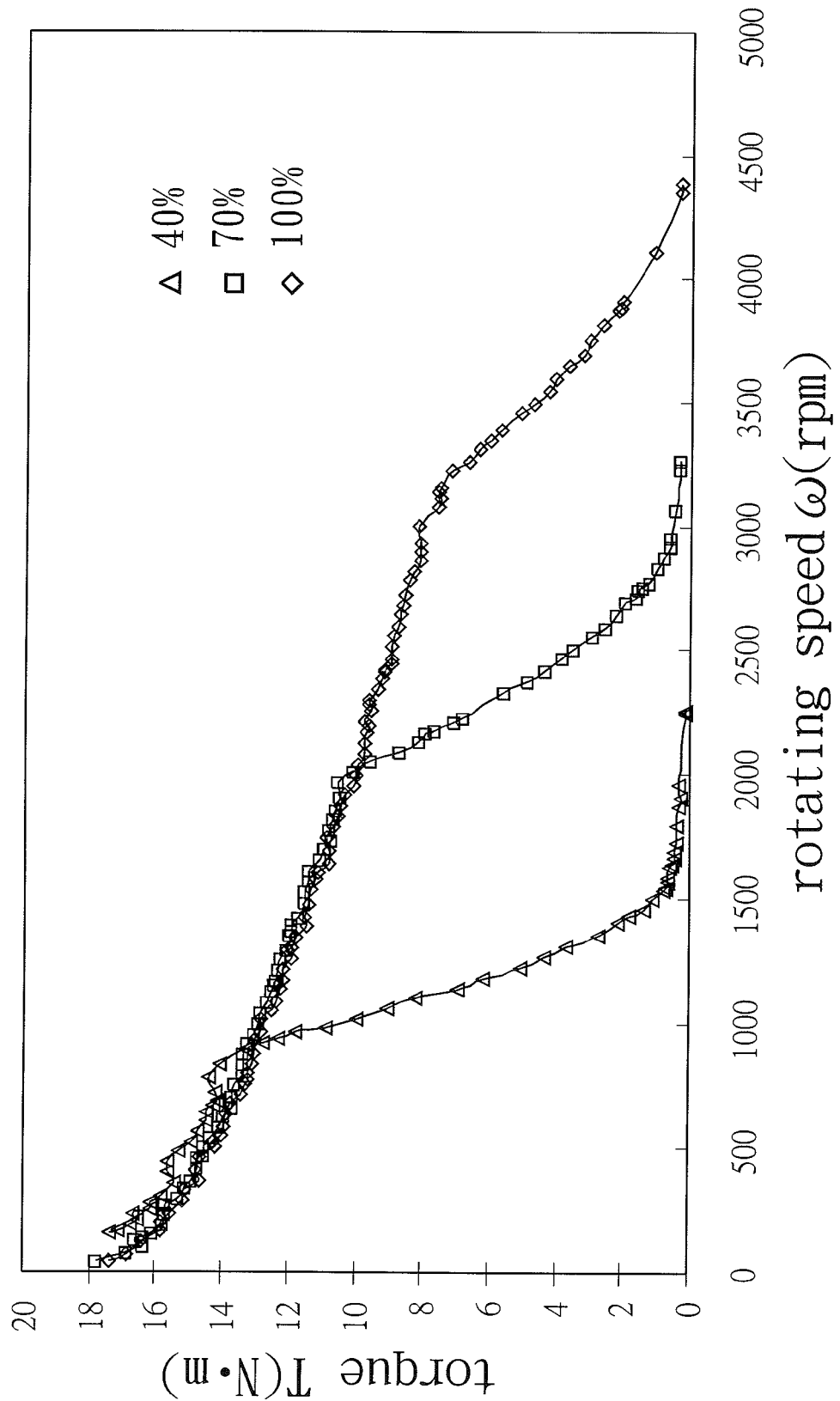
FIG. 3 is a diagram showing characteristic curves of a first motor of an example according to the present invention.

Specifically, in the example of the power distribution method for an electric vehicle driven by two power sources according to the present invention, the characteristic curves of the first and second motors 11 and 12 must be tested in advance to obtain the torque T outputted by the first and second motors 11 and 12 responsive to different rotating speeds ω under respective operations at different duty cycles. The first motor 11 can be the same as or different from the second motor 12. Thus, the characteristic curves of the first motor 11 can be the same as or different from those of the second motor 12, which can be easily appreciated by one having ordinary skill in the art. In an example shown in FIG. 3 showing the characteristic curves of the first motor 11 respectively operating at 40% duty cycle, 70% duty cycle, and 100% duty cycle, the output curve of the first motor 11 operating in 100% duty cycle represents the maximum output of the first motor 11. When a motor operates at a rotating speed ω and outputs a torque T, it is referred to as an operation point of the motor. The characteristic curves of the first and second motors 11 and 12 show respective operation points of the first and second motors 11 and 12. Note that given the same rotating speed ω, the higher the torque T outputted by the motor, the higher the operational efficiency of the motor. Thus, the operational efficiency of the first and second motors 11 and 12 at every operation point can be derived from the characteristic curves of the first and second motors 11 and 12.

Figure 4:
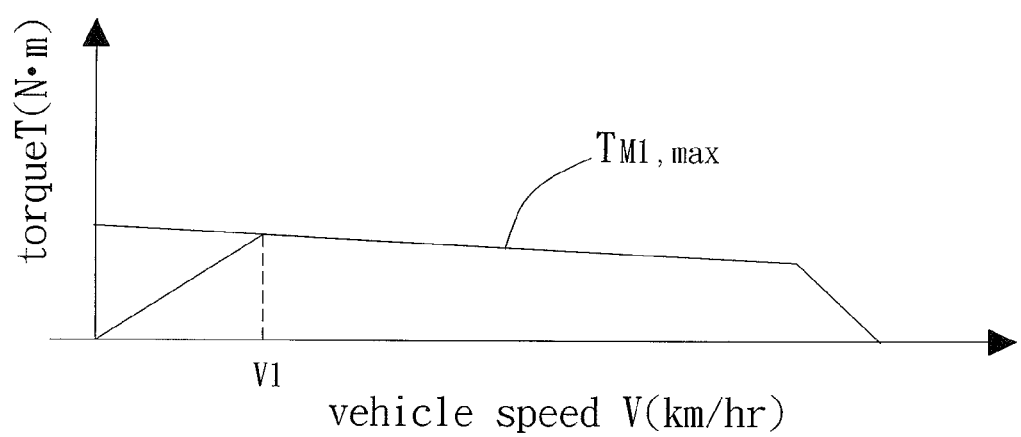
FIG. 4 is a diagram showing the maximum output torque of the first motor according to the present invention.
Figure 5A:
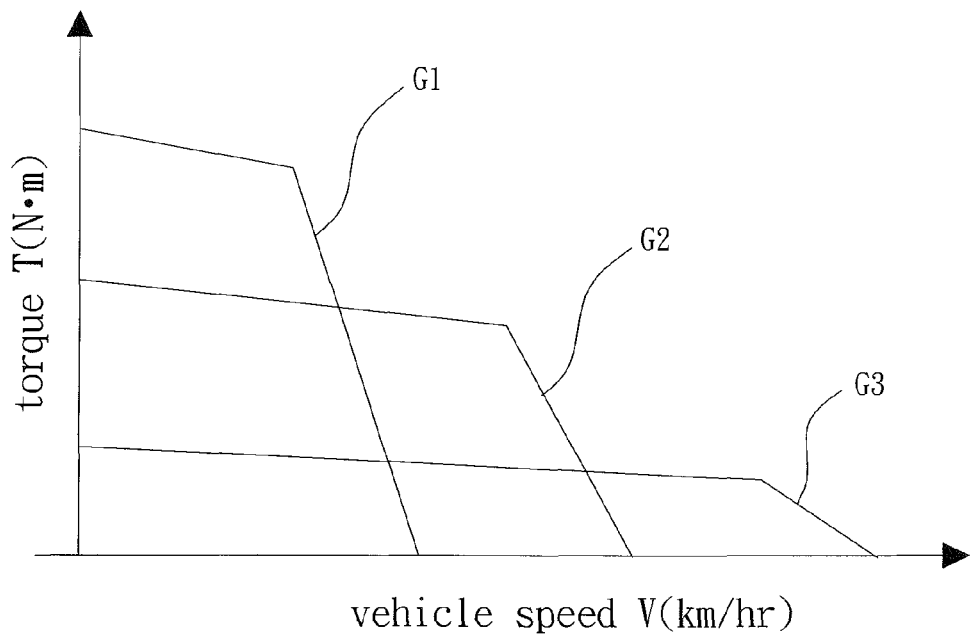
FIG. 5a a diagram showing the maximum output torque of a second motor connected to a transmission having three gears of an example according to the present invention.
Figure 5B:
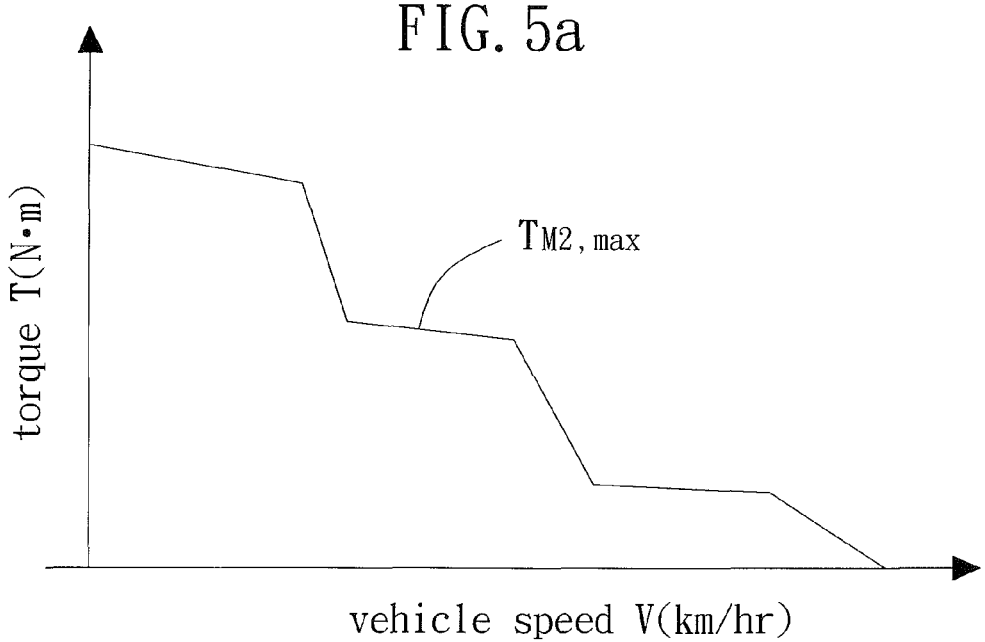
FIG. 5b a diagram showing the maximum output torque of the second motor responsive to different vehicle speeds according to the present invention.

With reference to FIG. 4, according to the gear ratio at which the first motor 11 transmits power to the transmission 14, the maximum output torque $T_{M1,max}$ of the first motor 11 at every vehicle speed V can be calculated by using the characteristic curves of the first motor 11. Likewise, with reference to FIG. 5a, according to the gear ratio at which the second motor 12 transmits power to the transmission 14, the maximum output torques $T_{M2,max}$ of the second motor 12 at different vehicle speed V can be calculated by using the characteristic curves of the second motor 12. In this example, the transmission 13 connected to the second motor 12 has first, second, and third gears G1, G2, and G3. Thus, the second motor 12 can have different maximum output torques at the first, second, and third gears G1, G2, and G3. The maximum output torque $T_{M2,max}$ of the second motor 12 is obtained by combining the maximum output torques of the second motor 12 at the first, second, and third gears G1, G2, and G3, as shown in FIG. 5b. Thus, the maximum torque $T_{max}$ output of the electric vehicle 1 corresponding to every vehicle speed V is expressed by expression (1) as follows:

$$T_{max}(V)=[T_{M1,max}(V)\times r_{g1}+T_{M2,max}(V)\times r_{g2}]\times r_f \quad (1)$$

wherein $r_{g1}$ is the gear ratio at which the first motor 11 transmits power to the transmission 14, $r_{g2}$ is the gear ratio at which the second motor 12 transmits power to the transmission 14 via the transmission 13, $r_f$ is the final gear ratio at which the transmission 14 transmits the toque to a driving wheel 16 of the electric vehicle 1.

Figure 6:
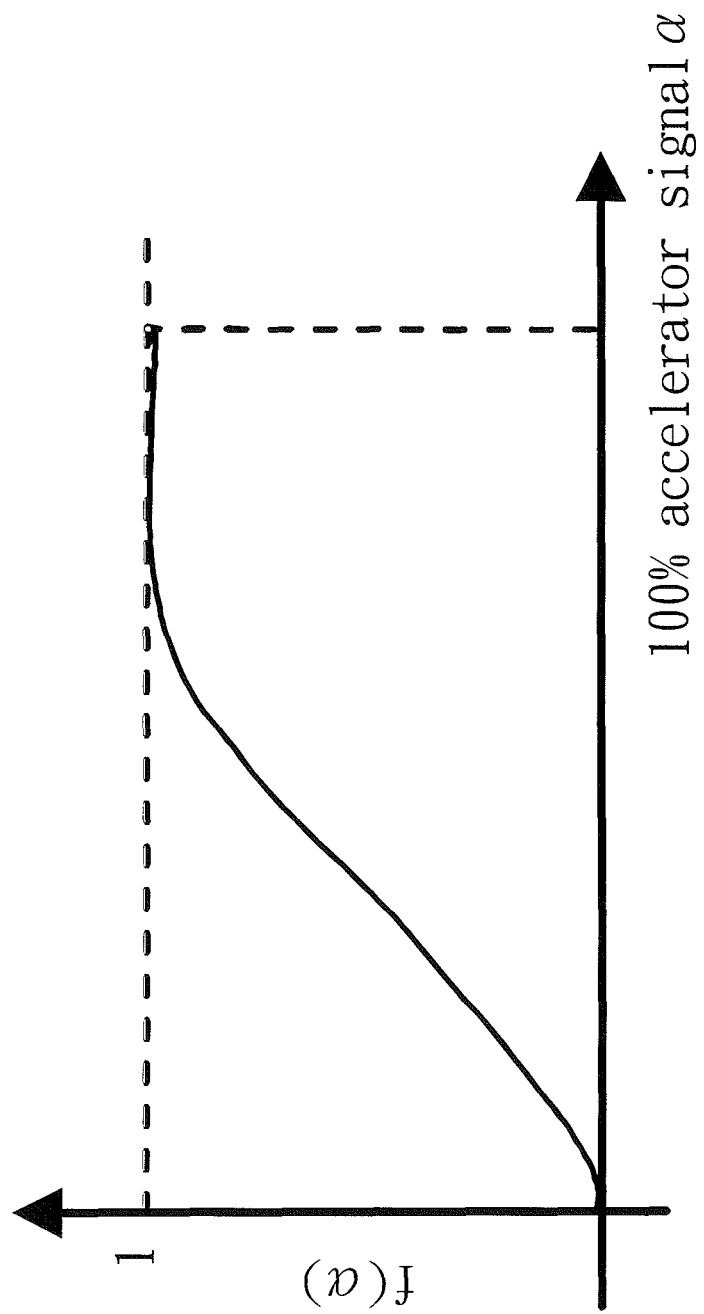
FIG. 6 is a diagram showing relationship between an accelerator signal and a torque demand of the example according to the present invention.

When the vehicle control unit 15 adjusts the ratio of the power outputted from the first motor 11 to the power outputted from the second motor 12, the torque demand $T_d$ of the electric vehicle 1 is firstly calculated and decided by an accelerator signal α. The accelerator signal α can be generated by a conventional accelerator (such as an accelerator pedal or an accelerator handle) and inputted to the vehicle control unit 15. The relationship between the torque demand $T_d$ and the accelerator signal α is expressed by expression (2) as follows:

$$T_d=f(\alpha)\times T_{max}(V) \quad (2)$$

wherein $f(\alpha)$ is a polynomial function of the accelerator signal α and is in a range between 0 and 1. The feel of handling of a driver driving the electric vehicle 1 can be changed by modulating the polynomial function $f(\alpha)$. One having ordinary skill in the art should appreciate that FIG. 6 is merely an example of the polynomial function $f(\alpha)$.

After determining the torque demand $T_d$ of the electric vehicle 1, the maximum output torque $T_{M1,max}$ of the first motor 11 and the maximum output torque $T_{M2,max}$ of the second motor 12 can be used to decide the ratio of the power outputted from the first motor 11 to the power outputted from the second motor 12 such that the total output torque of the first and second motors 11 and 12 satisfies the torque demand $T_d$. The power demand $P_d$ decided by the torque demand $T_d$ is expressed by expression (3) as follows:

$$P_d=T_d\times \omega_w \quad (3)$$

wherein $\omega_w$ is the rotating speed of the driving wheel 16 of the electric vehicle 1 and can be obtained from the vehicle speed V. When transmission 13 is in a fixed gear, the relationship between the power demand $P_d$ and the powers $P_{M1}$ and $P_{M2}$ outputted from the first and second motors 11 and 12 is expressed by expression (4) as follows:

$$P_d=P_{M1}+P_{M2} \quad (4)$$

Namely, the sum of the output power $P_{M1}$ of the first motor 11 and the output power $P_{M2}$ of the second motor 12 is equal to the power demand $P_d$ based on which the vehicle control unit 15 can execute the first power distribution law that is expressed by expression (5) as follows:

$$P_{M1}=a\times P_d, P_{M2}=(1-a)\times P_d \quad (5)$$

wherein a is a distribution ratio and is in a range between 0 and 1.

Furthermore, the output power $P_{M1}$ of the first motor 11 and the output power $P_{M2}$ of the second motor 12 can be respectively expressed by expressions (6) and (7) as follows:

$$P_{M1} = T_{M1} \times \omega_1, \quad T_{M1} \square T_{M1,max} \tag{6}$$

$$P_{M2} = T_{M2} \times \omega_2, \quad T_{M2} \square T_{M2,max} \tag{7}$$

wherein $T_{M1}$ is the output torque of the first motor 11, $T_{M2}$ is the output torque of the second motor 12, $\omega_1$ is a rotating speed of the first motor 11 derived from the vehicle speed V and the gear ratio $r_{g1}$ between the first motor 11 and the transmission shaft 14, and $\omega_2$ is a rotating speed of the second motor 12 derived from the vehicle speed V and the gear ratio $r_{g2}$ between the second motor 12 and the transmission shaft 14. The output torque $T_{M1}$ of the first motor 11 and the output torque $T_{M2}$ of the second motor 12 can be respectively calculated based on the numerical values of the output power $P_{M1}$ of the first motor 11 and the output power $P_{M2}$ of the second motor 12.

Nevertheless, the total power $P_{consum}$ consumed by the first and second motors 11 and 12 can be expressed by expression (8) as follows:

$$P_{consum} = T_{M1} \times \omega_1 / \eta_{M1} + T_{M2} \times \omega_2 / \eta_{M2} \tag{8}$$

wherein $\eta_{M1}$ is an operational efficiency at an operation point where the first motor 11 has the output torque $T_{M1}$ and the rotating speed $\omega_1$, $\eta_{M1}$ is derivable from the characteristic curves of the first motor 11, $\eta_{M2}$ is an operational efficiency at an operation point where the second motor 12 has the output torque $T_{M2}$ and the rotating speed $\omega_2$, and $\eta_{M2}$ is derivable from the characteristic curves of the second motor 12.

By adjusting the value of the distribution ratio "a" through use of the first distribution law, the output torque $T_{M1}$ of the first motor 11 and the output torque $T_{M2}$ of the second motor 12 can be simultaneously changed to affect the total power $P_{consum}$ consumed by the first and second motors 11 and 12. Thus, an optimal distribution ratio "a" is selected to minimize the total power $P_{consum}$ consumed by the electric vehicle 1. According to the above expressions (5), (6), (7), and (8), the characteristic curves of the first and second motors 11 and 12 can be used, and data of the optimal distribution ratios "a" for minimizing the total power according to different vehicle speeds V, every gear of the transmission 13, and different power demands $P_d$ is obtained in advance and stored in the vehicle control unit 15 to construct a distribution ratio database. In actual use, the vehicle control unit 15 acquires an optimal distribution ratio "a" based on the vehicle speed V of the electric vehicle 1, the power demand $P_d$, and the current gear of the transmission 13 and cross references the distribution ratio database as well as using a conventional look-up table method in cooperation with an interpolation method.

After determination of the distribution ratio "a", the output torque $T_{M1}$ of the first motor 11 and the output torque $T_{M2}$ of the second motor 12 can be respectively calculated from the output power $P_{M1}$ of the first motor 11 and the output power $P_{M2}$ of the second motor 12. Furthermore, the rotating speed $\omega_1$ of the first motor 11 and the rotating speed $\omega_2$ of the second motor 12 can be derived from the vehicle speed V. Thus, the vehicle control unit 15 can drive the first and second motors 11 and 12 respectively through the motor drivers 111 and 121 to operate at the operation points under the above torque and rotating speed conditions. Namely, the first and second motors 11 and 12 can fulfill the torque demand $T_d$ of the electric vehicle 1 at the most efficient operation point, accomplishing the adjustment of the ratio of the power outputted from the first motor 11 to the power outputted from the second motor 12.

Considering the efficiencies of motors of different types, the first and second motors 11 and 12 of the electric vehicle 1 are preferably brushless DC motors (BLDC). However, obvious torque ripples occur at low speeds of brushless DC motors and are amplified by backlashes between transmission gears, generating noise. The noise becomes more obvious if the rotating speed is lower or if the output torque is higher. Furthermore, the first motor 11 directly transmits the power to the transmission shaft 14 at the fixed gear ratio $r_{g1}$, and the second motor 12 transmits power through the transmission 13 to the transmission shaft 14 at an adjustable gear ratio $r_{g2}$. Thus, the transmission 13 can be shifted to a lower gear such that the gear ratio $r_{g2}$ of the second motor 12 can be larger than the gear ratio $r_{g1}$ of the first motor 11. By respectively using the first and second motors 11 and 12 to drive a vehicle at the same speed, the rotating speed of the first motor 11 will be lower than the second motor 12 such that, when at a low speed, the operational noise caused by the first motor 11 will be more obvious than that caused by the second motor 12 and such that the power output efficiency of the second motor 12 will be significantly higher than that of the first motor 11 outputting power at a fixed gear ratio. Thus, to reduce the noise caused by the torque ripples at low speeds of the brushless DC motors, the first power distribution law executed by the vehicle control unit 15 preferably limits the power outputted from the first motor 11 at low speeds.

In other words, the characteristics of the first power distribution law according to the present invention are that when the electric vehicle 1 starts to accelerate from a still state, the distribution ratio "a" increases as the vehicle speed V increases. Furthermore, when the vehicle speed is zero and the electric vehicle 1 is about to move, the power of the electric vehicle 1 is preferably completely supplied by the second motor 12 such that the distribution ratio "a" is zero. The distribution ratio "a" increases as the vehicle speed V increases, gradually increasing the proportion of the power outputted from the first motor 11. When the vehicle speed V reaches a critical speed V1, the first motor 11 outputs full torque. The critical speed V1 is obtained through experiments. In an example shown in FIG. 4, the critical speed V1 is set according to the characteristic curves of the first motor 11. The critical speed V1 could change due to affect by the characteristic curves of the first motor 11 and the gear ratio $r_{g1}$ of the first motor 11. However, the present invention is not limited to this example.

Through the above steps, after the electric vehicle 1 is started, the vehicle control unit 15 receives the accelerator signal α and the vehicle speed signal and calculates the torque demand $T_d$ of the electric vehicle 1 according to the expressions (1) and (2). The torque demand $T_d$ is used to decide the power demand $P_d$. By using the first power distribution law, the corresponding distribution ratio "a" can be found from the distribution ratio database according to the vehicle speed V of the electric vehicle 1 and the current gear of the transmission 13. Then, the distribution ratio "a" and the power demand $P_d$ are used to determine the output power $P_{M1}$ of the first motor 11 and the output power $P_{M2}$ of the second motor 12 such that the first and second motors 11 and 12 operate at their most efficient operation points, respectively. By properly arranging the distribution ratio, in a case that the vehicle speed V is low, the second motor 12 is the main power output for the electric vehicle 1 to effectively avoid noise caused by the first motor 11 running at low speeds. Furthermore, application of the distribution ratio "a" allows the first and second motors 11 and 12 to operate at the most efficient operation points to minimize the total power $P_{consum}$ consumed by the electric vehicle 1, effectively increasing the power output efficiency of the electric vehicle 1.

During movement of the electric vehicle 1, the target gear that the transmission 13 should use is continuously detected. Specifically, a shifting map is selected out of a plurality of shifting maps according to a vehicle load estimation algorithm. Then, the target gear is judged based on the shifting map, the vehicle speed V of the electric vehicle 1, and the torque demand $T_d$. More specifically, the vehicle load estimation algorithm is used to calculate a driving resistance L to the electric vehicle 1. The driving resistance L includes rolling resistance, drag resistance, and gradient resistance and is expressed by expression (9) as follows:

$$L = \mu m g \cos\theta + \frac{1}{2}\rho A C_d V^2 + mg \sin\theta \tag{9}$$

wherein m is the mass of the electric vehicle 1, μ is a rolling resistance coefficient and is assumed as a constant, g is the gravitational acceleration, θ is a grade of a road on which the electric vehicle 1 moves, ρ is the air density, A is a frontal area of the electric vehicle 1, and $C_d$ is a drag resistance coefficient. Since the rolling resistance coefficient μ, the gravitational acceleration g, the air density ρ, the frontal area A of the electric vehicle 1, and the drag resistance coefficient $C_d$ can be deemed as constants, the driving resistance L can be calculated by estimating the mass m of the electric vehicle 1 and the grade of the road θ.

The principle for obtaining the driving resistance L from the vehicle load estimation algorithm is as follows. The relationship between the acceleration $\dot{V}$ of the electric vehicle 1, the tractive force $F_t$ imparted to the driving wheel 16 of the electric vehicle 1, and the driving resistance L is expressed by expression (10) as follows:

$$m\dot{V} = F_t - L = F_t - \mu m g \cos\theta - \frac{1}{2}\rho A C_d V^2 - mg \sin\theta \tag{10}$$

The tractive force $F_t$ is the propulsive force obtained by the driving wheel 16 of the electric vehicle 1 without slip and can be calculated from the output torques of the first and second motors 11 and 12 by using expression (11) as follows:

$$F_t = \frac{(T_{M1} \cdot r_{g1} + T_{M2} \cdot r_{g2} \cdot \eta) \cdot r_f}{r_{wheel}} \tag{11}$$

wherein $T_{M1}$ is the output torque of the first motor 11, $T_{M2}$ is the output torque of the second motor 12, $r_{g1}$ is the gear ratio at which the first motor 11 transmits power to the transmission 14, $r_{g2}$ is the gear ratio at which the second motor 12 transmits power to the transmission 14 via the transmission 13, η is the transmission efficiency of the transmission 13, $r_f$ is the final gear ratio, and $r_w$ is the radius of the driving wheel 16 of the electric vehicle 1.

Apart from the output torque $T_{M1}$ of the first motor 11 and the output torque $T_{M2}$ of the second motor 12, the parameters in expression (11) are known. Note that the torque outputted by a conventional motor is in proportion to the electric current. When the motor speed approximates the rating speed, a current sensor is used to detect the input current i of the motor driver. The output torque can be calculated by using a motor torque constant $K_t$ (T=$K_t$×i). Thus, the output torques $T_{M1}$ and $T_{M2}$ of the first and second motors 11 and 12 can be calculated based on the motor currents $i_1$ and $i_2$ of the motor drivers 111 and 121, and the tractive force $F_t$ can be obtained by using expression (11).

Expression (10) can, thus, be rearranged as expression (12) as follows:

$$\dot{V} = (F_t - F_a)\frac{1}{m} - g\sqrt{1+\mu^2}\sin(\theta + \psi) \tag{12}$$

$$= [F_t - F_a - g\sqrt{1+\mu^2}]\begin{bmatrix} 1/m \\ \sin(\theta+\psi) \end{bmatrix}$$

wherein $$F_a = \frac{1}{2}\rho A C_d V^2,$$

$F_a$ can easily be calculated in a case that the vehicle speed V is known, $$\psi = \sin^{-1}\left(\frac{\mu}{\sqrt{1+\mu^2}}\right),$$

ψ is a constant if the road is constructed by the same material such as asphalt. By using expression (12), the mass m of the electric vehicle 1 and the grade θ of the road on which the electric vehicle 1 moves are estimated by using a recursive least-square error method (RLSE) or other conventional parameter estimation algorithms. An on-line parameter estimator is built in the vehicle control unit 15 to carry out estimation. As an example, given the following expression (13):

$$y = \dot{V}, \quad C = [F_t - F_a \; g\sqrt{1+\mu^2}], \quad X = \begin{bmatrix} \frac{1}{m} & \sin(\theta+\psi) \end{bmatrix}^T \tag{13}$$

expression (12) can be written as the following expression (14):

$$y = CX \tag{14}$$

wherein X is the parameter to be estimated.

According to the on-line parameter estimation rule of the recursive least-square error method, assuming that it is at $k_{th}$ time sampling point now, and the error ε(k) of the parameter estimation can be expressed by expression (15) as follows:

$$\epsilon(k)_{1\times1} = y(k)_{1\times1} - C(k)_{1\times2}\hat{X}(k-1)_{2\times1} \tag{15}$$

The estimated value $\hat{X}$ can be expressed by expression (16) as follows:

$$\hat{X}(k)_{2\times1} = \hat{X}(k-1)_{2\times1} + \gamma(k)_{2\times1}\epsilon(k)_{1\times1} \tag{16}$$

wherein γ(k) is a matrix the dimension of which is expressed by the subscript in expression (16). According to the on-line parameter estimation rule of the recursive least-square error method, the calculating formula of the matrix γ(k) is as follows:

$$\gamma(k)_{2\times 1} = \frac{P(k-1)_{2\times 2}C^T(k)_{2\times 1}}{\lambda_{1\times 1} + C(k)_{1\times 2}P(k-1)_{2\times 2}C^T(k)_{2\times 1}} \quad (17)$$

$$P(k)_{2\times 2} = \frac{1}{\lambda_{1\times 1}}[I_{2\times 2} - \gamma(k)_{2\times 1}C(k)_{1\times 2}] \cdot P(k-1)_{2\times 2}$$

The above estimation formula is stored in the vehicle control unit 15 in advance. After the vehicle control unit 15 receives the vehicle speed V and the motor currents $i_1$ and $i_2$ of the motor drivers 111 and 121, real-time on-line parameter estimation can be carried out one by one after substitution of the parameters y and C in expression (13) to generate the estimated value $\hat{X}$ of the parameter X. Since the grade θ of the road on which the electric vehicle 1 moves changes according to the road surface conditions, correction of the estimated value $\hat{X}$ of the parameter X must not be stopped in the estimation formula. Therefore, a forgetting factor λ is added into the estimation formula of the recursive least-square error method.

By installing a parameter estimator using the recursive least-square error method in the vehicle control unit 15, the vehicle control unit 15 can read the vehicle speed V and the motor currents $i_1$ and $i_2$ of the motor drivers 111 and 121 during movement of the electric vehicle 1 to instantly estimate the mass m of the electric vehicle 1 and the grade θ of the road, and expression (9) is used to calculate the driving resistance L of the electric vehicle 1, accomplishing the vehicle load estimation algorithm.

Figure 7:
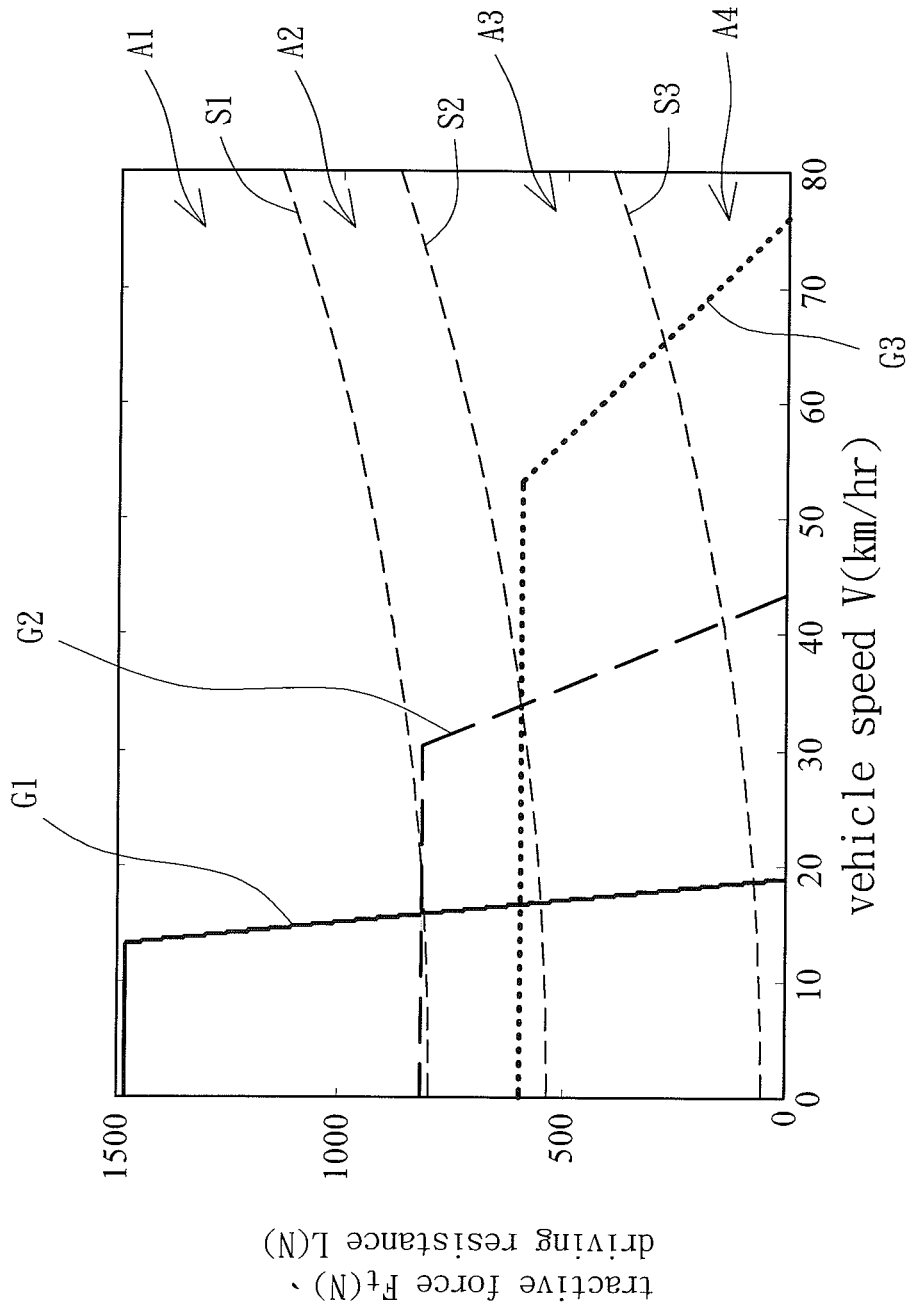
FIG. 7 is a diagram illustrating a load range of the example according to the present invention.

FIG. 7 shows the relationship between the vehicle speed V of the electric vehicle 1 and the tractive force $F_t$ outputted by the second motor 12 at the first, second, and third gears G1, G2, and G3 of the transmission 13 while the distribution ratio "a" is zero. FIG. 7 also depicts the change in the driving resistance L responsive to the change in the vehicle speed V of the electric vehicle 1 moving on three grades S1, S2, and S3. During movement of the electric vehicle 1 at any vehicle speed V, the tractive force $F_t$ must be larger than the driving resistance L to maintain the vehicle speed V or to accelerate. Thus, the driving resistance L on the three grades S1, S2, and S3 can be divided into four load ranges A1, A2, A3, and A4. In the load range A1, only the first gear G1 of the transmission 13 can be used, otherwise the tractive force $F_t$ would be smaller than the driving resistance L and result in deceleration. In the load range A2, either of the first gear G1 and the second gear G2 can be used. In the load ranges A3 and A4, all of the first, second, and third gears G1, G2, and G3 of the transmission 13 can be used.

Figure 8:
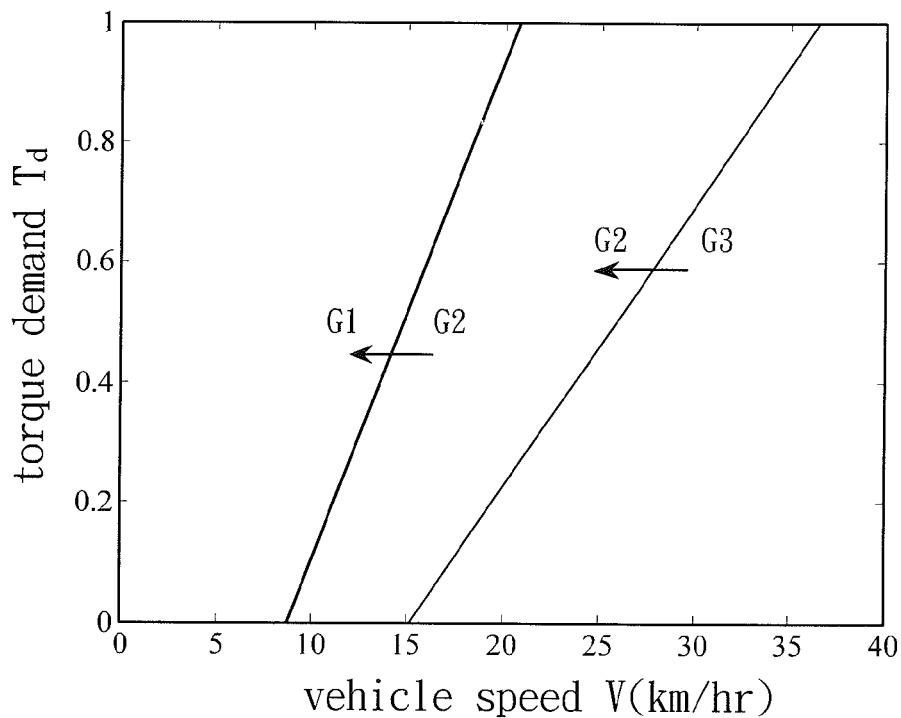
FIG. 8 is a diagram illustrating a shifting map of the example according to the present invention.
Figure 9:
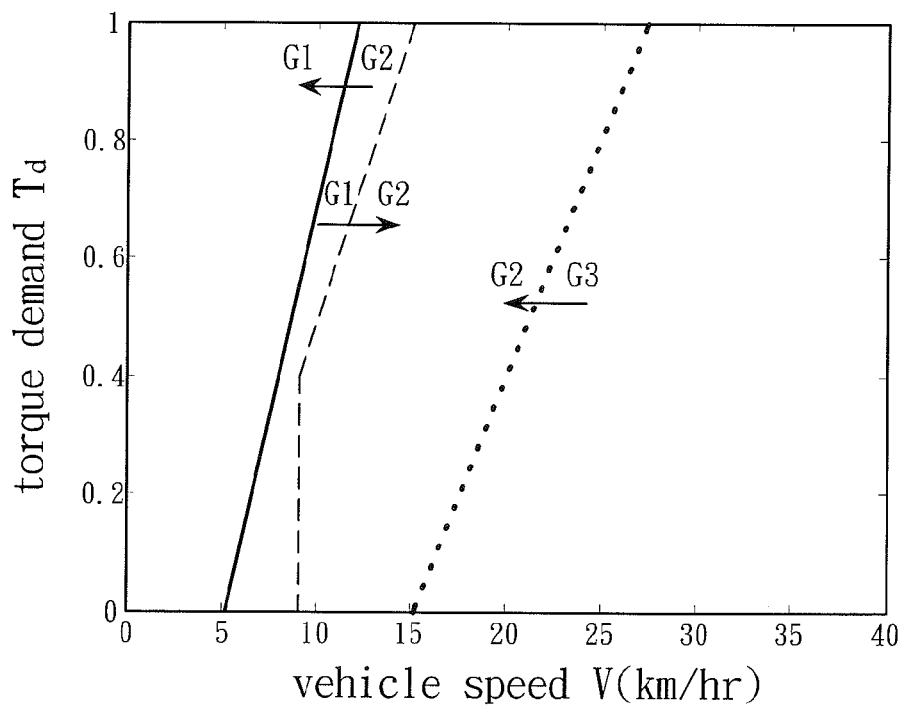
FIG. 9 is a diagram illustrating another shifting map of the example according to the present invention.
Figure 10:
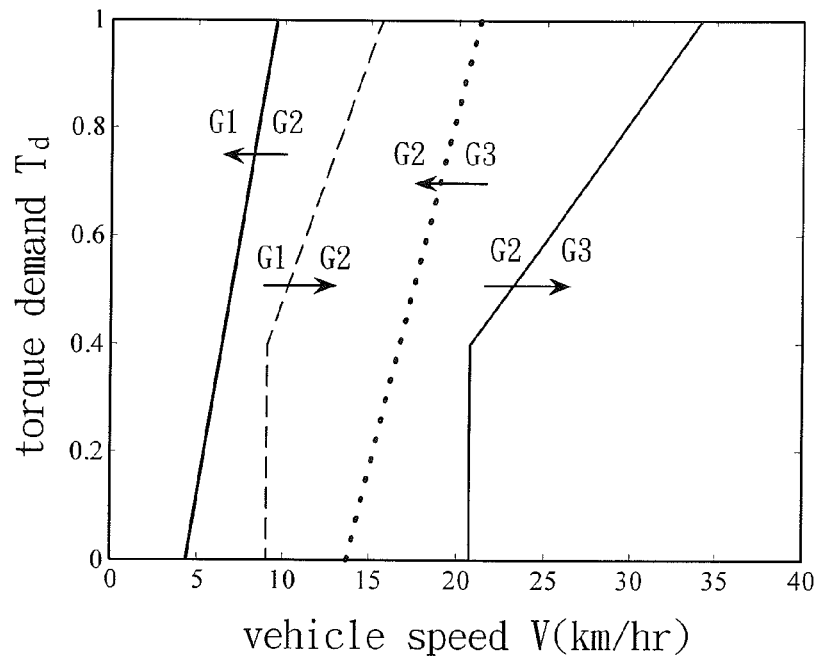
FIG. 10 is a diagram illustrating a further shifting map of the example according to the present invention.
Figure 11:
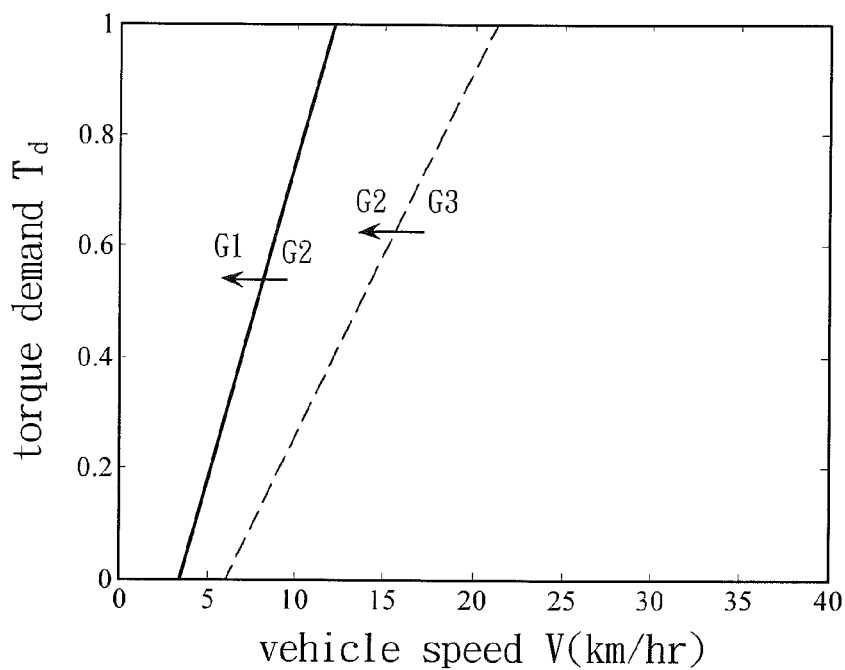
FIG. 11 is a diagram illustrating still another shifting map of the example according to the present invention.

Four shifting maps can be respectively designed for the four load ranges A1, A2, A3, and A4. Each shifting map is a table cross referencing the vehicle speed V and the torque demand $T_d$ of the electric vehicle 1 to the target gear of the transmission 13, allowing the vehicle control unit 15 to judge the target gear of the transmission 13 according to the change in the vehicle speed V and the torque demand $T_d$. The shifting map corresponding to the load range A1 is shown in FIG. 8, apart from the first gear G1 of the transmission 13, the tractive force $F_t$ is obviously insufficient such that the shifting map merely considers downshift. The shifting map corresponding to the load range A2 is shown in FIG. 9, and both of the first and second gears G1 and G2 of the transmission 13 work effectively. The tractive force $F_t$ outputted by the third gear G3 is insufficient. Thus, when in the load range A2, the shifting map only allows shifting between the first and second gears G1 and G2. If the current gear is the third gear G3, downshift is considered in terms of the vehicle speed V and the torque demand $T_d$. The shifting map corresponding to the load range A3 is shown in FIG. 10, and all of the first, second, and third gears G1, G2, and G3 of the transmission 13 work effectively. Thus, the shifting map covers upshift and downshift at the first, second, and third gears G1, G2, and G3. The shifting map corresponding to the load range A4 is shown in FIG. 11. Since load range A4 is generally a downslope condition, the transmission 13 should be downshifted to control the rotating speed of the second motor 12 so as to provide a proper resistance for assisting in braking. Thus, the shifting map regulates the transmission 13 to proceed with downshift only, and upshift is prohibited.

Note that if the distribution ratio "a" is not zero, the tractive force $F_t$ of the electric vehicle 1 is supplied by both of the first and second motors 11 and 12. Thus, the shifting map will vary in response to different distribution ratios "a". Dividing the load ranges and establishing shifting maps can easily be appreciated by one having ordinary skill in the art. The above shifting map design is merely an example and should not be used to restrict the present invention. After the vehicle control unit 15 obtains the driving resistance L to the electric vehicle 1 based on the vehicle load estimation algorithm, a shifting map is selected according to the driving resistance L. Namely, the vehicle control unit 15 selects a corresponding shifting map according to a corresponding load range to which the driving resistance L belongs. As an example, if the driving resistance L belongs to the load range A1, the vehicle control unit 15 selects the shifting map shown in FIG. 8 and determines the target gear of the transmission 13 according to the vehicle speed V and the torque demand $T_d$ of the electric vehicle 1.

After the vehicle control unit 15 determines the target gear, it is determined whether the target gear is equal to the current gear of the transmission 13. If the target gear is equal to the current gear, it is not necessary to shift the transmission 13. The vehicle control unit 15 keeps executing the first power distribution law and keep maintaining the target gear of the transmission 13. On the other hand, if the target gear is different from the current gear, shifting of the transmission 13 is required, and the vehicle control unit 15 shifts the transmission 13 to the target gear.

Figure 12:
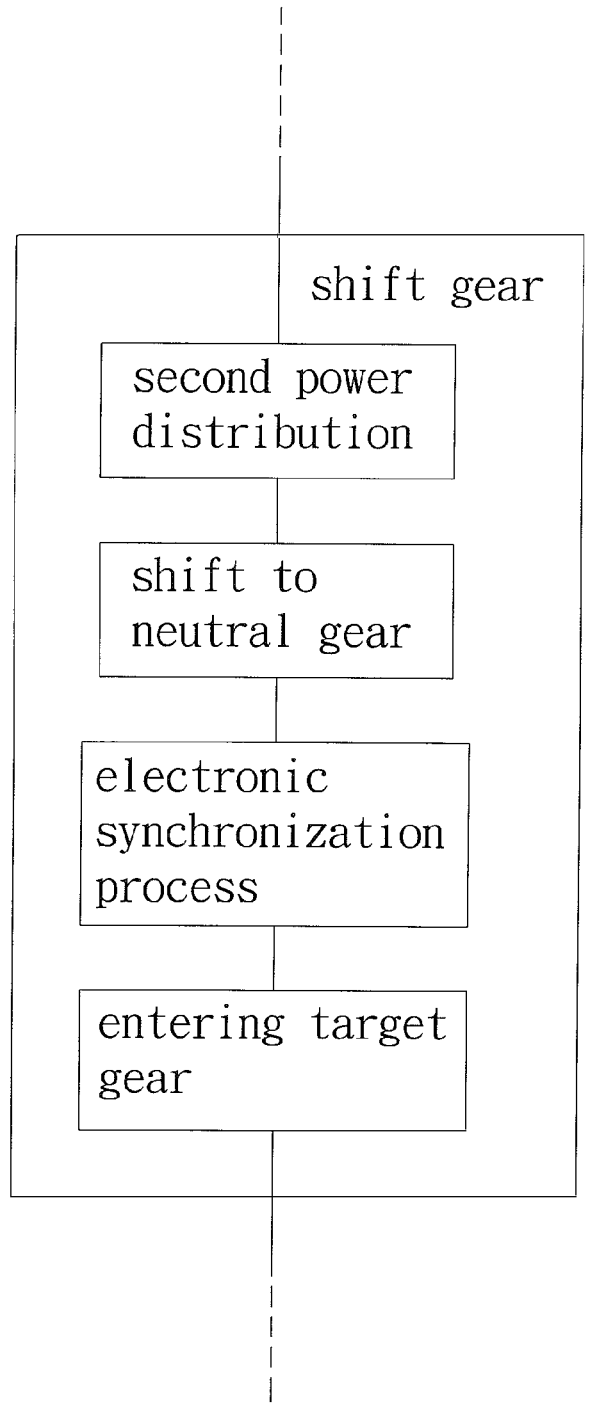
FIG. 12 is a flowchart illustrating gear shifting of the example according to the present invention.
Figure 13:
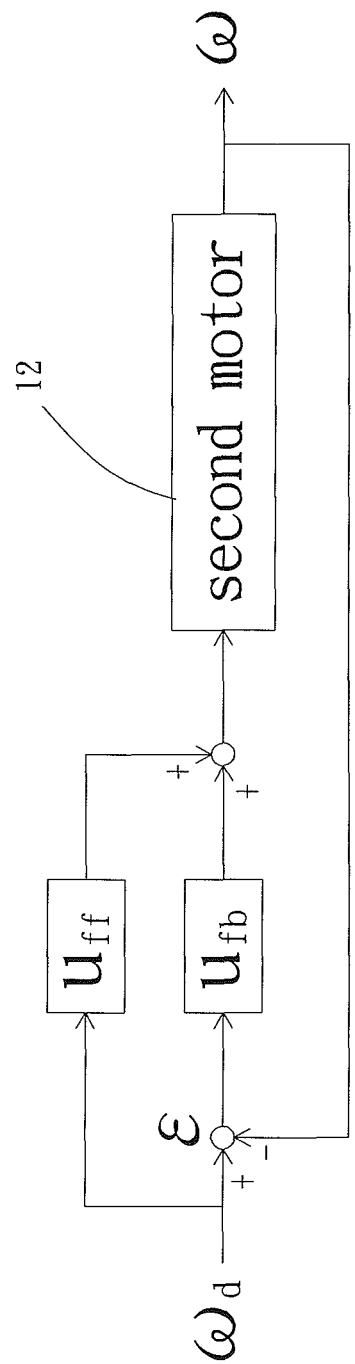
FIG. 13 is a schematic view illustrating electronic synchronous control of the example according to the present invention.

With reference to FIG. 12, when the vehicle control unit 15 is about to shift the gear, the power distribution is firstly carried out according to a second power distribution law in which the first motor 11 supplies the electric vehicle 1 with the torque demand $T_d$. Namely, in terms of power, the relationship between the power demand $P_d$ required by the electric vehicle 1, the output power $P_{M1}$ of the first motor 11, and the output power $P_{M2}$ of the second motor 12 is expressed by expression (18) as follows:

$$P_{M1}=P_d, P_{M2}=0 \quad (18)$$

Thus, the second motor 12 does not output power during the gear shifting process. The power demand $P_d$ of the electric vehicle 1 is completely supplied by the first motor 11 such that the electric vehicle 1 will not have any torque hole during the gear shifting process to effectively maintain the vehicle speed V. As a result, the gear shifting process is smooth because the change in the vehicle speed V is small, avoiding uncomfortable feeling resulting from the change in the vehicle speed V and avoiding loss of the kinetic energy of the electric vehicle 1 while providing a smooth power output for the electric vehicle 1 during the gear shifting process.

After the second power distribution law is executed by the vehicle control unit 15, a gear shifting actuator 132 is driven via a gear shifting driver 131 to shift the current gear of the transmission 13 into a neutral gear. Specifically, when it is desired to shift the transmission 13 having a limited number of gears to the neutral gear, the vehicle control unit 15 gives a command to actuate the gear shifting actuator 132 in the transmission 13 to move a gear shifting fork, causing disengagement of the driving gear from the driven gear of the current gear and shifting into the neutral gear.

Before the transmission 13 is shifted into gear again, an electronic synchronization process must be carried out beforehand to control the difference in the rotating speeds of the input shaft and the output shaft (i.e., the transmission shaft 14 of the electric vehicle 1) to be in a small range to allow smooth mechanical synchronization during the gear shifting process. In the electronic synchronization process, the rotating speed $\omega_1$ of the first motor 11 is converted into the target rotating speed $\omega_2$ of the second motor 12 based on the ratio of the gear ratio $r_{g1}$ at which the first motor 11 transmits power to the transmission shaft 14 to the gear ratio $r_{g2}$ at which the second motor 12 transmits power via the transmission 13 to the transmission shaft 14, and the motor driver 121 drives the second motor 12 to rotate until the rotating speed $\omega_2$ of the second motor 12 reaches the target rotating speed $\omega_d$.

With reference to FIG. 10, in this example, to accurately and rapidly adjust the rotating speed of the second motor 12 for increasing the speed of the electronic synchronization process, the vehicle control unit 15 preferably uses a proportional-integral-derivative controller (PID controller) and a feedforward controller to control the rotating speed of the second motor 12 such that an error $\epsilon$ between the rotating speed $\omega_2$ and the target rotating speed $\omega_d$ of the second motor 12 is rapidly reduced to be in a specific range (such as ±200 rpm). The control amount $u_{fb}$ of the proportional-integral-derivative control and the control amount $u_{ff}$ of the feedforward controller can respectively be expressed by expressions (19) and (20) as follows:

$$u_{fb} = k_p \times \epsilon + \int k_i \times \epsilon \cdot dt + k_d \times \dot{g} \tag{19}$$

$$u_{ff} = J\dot{\omega} + B\omega \tag{20}$$

wherein $k_p$, $k_i$, and $k_d$ are parameters of proportional, integral, and derivative controls, J is the equivalent inertia of the second motor 12, B is the damping of the second motor 12.

During the electronic synchronization process, the power $P_{M2}$ outputted from the second motor 12 is decided by the sum of the control amount $u_{fb}$ of the proportional-integral-derivative control and the control amount $u_{ff}$ of the feedforward controller.

Note that in addition to the proportional-integral-derivative controller and the feedforward controller, the rotating speed of the second motor 12 can be controlled by other control methods. The present invention is not limited by the control methods. Furthermore, since the transmission 13 is in the neutral gear during the electronic synchronization process, the power $P_{M2}$ outputted from the second motor 12 is only used to adjust the rotating speed of the second motor 12 and is not transmitted to the transmission shaft 14 of the electric vehicle 1 via the transmission 13. After the electronic synchronization process is accomplished (the error a is successfully reduced to be in the specific range), the power $P_{M2}$ outputted from the second motor 12 is zeroed for subsequent shifting into gear.

After the vehicle control unit 15 finishes the electronic synchronization process, the gear shifting actuator 132 is driven via the gear shifting driver 131 to shift the transmission 13 to the target gear. Specifically, when it is desired to shift the transmission 13 into the target gear, the vehicle control unit 15 actuates the gear shifting actuator 132 in the transmission 13 to move the gear shifting fork, causing engagement of the driving gear and the driven gear of the target gear and gradually shifting into the desired gear.

By the above gear shifting process, when the target gear is different from the current gear, the vehicle control unit 15 can shift the gear of the transmission 13 to the target gear. Since the power output characteristics of the second motor 12 are affected after a change in the gear of the transmission 13, the vehicle control unit 15 redistributes the power according to the first power distribution law suitable to the target gear, assuring continuous operation of the first and second motors 11 and 12 at the most efficient operation points.

In view of the foregoing, an objective of the present invention is to provide a power distribution method for an electric vehicle 1 driven by two power sources, wherein a vehicle control unit 15 is used to execute a first power distribution law that sets a distribution ratio "a" based on the vehicle speed V of the electric vehicle 1, the power demand $P_d$, and a transmission 13. The ratio of the power $P_{M1}$ outputted from the first motor 11 to the power $P_{M2}$ outputted from the second motor 12 is adjusted according to the distribution ratio "a" such that the first and second motors 11 and 12 can operate at the most efficient operation points while avoiding noise resulting from the first motor 11 running at low speeds, increasing the operational efficiency of the electric vehicle 1.

Furthermore, the power distribution method for an electric vehicle 1 driven by two power sources according to the present invention uses the vehicle control unit 15 to estimate the driving resistance L to the electric vehicle 1 by using a vehicle load estimation algorithm. A shifting map is selected according to the driving resistance L and is used to judge the target gear of the transmission 13 connected to the second motor 12 based on the vehicle speed V and the torque demand $T_d$ of the electric vehicle 1 such that the transmission 13 can be maintained in the optimal gear allowing the second gear 12 to continuously operate at the best efficiency to output an optimal power, reducing the energy consumed by the electric vehicle 1. The driver does not have to judge and shift the gear of the transmission 13, increasing the operational convenience.

Further, in the power distribution method for an electric vehicle 1 driven by two power sources according to the present invention, before shifting the gear of the transmission 13, the total power demand $P_d$ of the electric vehicle 1 is supplied by the first motor 11 to assure the electric vehicle 1 will not have any torque hole during the gear shifting process, maintaining the vehicle speed V and ensuring gear shifting smoothness. Furthermore, the vehicle control unit 15 executes an electronic synchronization process to reduce the error 8 between the rotating speed $\omega_2$ of the second motor 12 and the target rotating speed $\omega_d$, effectively shortening the time required for gear shifting to increase the gear shifting quality. Thus, the electric vehicle 1 has a smooth power output during the gear shifting process to increase the driving comfort.

Although specific embodiments have been illustrated and described, numerous modifications and variations are still possible without departing from the scope of the invention. The scope of the invention is limited by the accompanying claims.

What is claimed is:

1. A power distribution method for an electric vehicle driven by two power sources comprising:
    driving a first motor and a second motor to run respectively by a vehicle control unit, with the first and second motors simultaneously outputting powers to a transmission shaft of the electric vehicle driven by the first and second motors;

receiving a vehicle speed signal indicative of a vehicle speed of the electric vehicle and an accelerator signal with the vehicle control unit;

calculating a torque demand of the electric vehicle based on the vehicle speed and the accelerator signal;

deciding a power demand of the electric vehicle based on the torque demand;

executing a first power distribution law to extract a distribution ratio from a distribution ratio database based on the vehicle speed, a current gear of a transmission connected to the second motor, and the power demand;

adjusting a ratio of a power outputted from the first motor to a power outputted from the second motor according to the distribution ratio;

calculating a driving resistance to the electric vehicle with the vehicle control unit by using a vehicle load estimation algorithm;

selecting a shifting map out of a plurality of shifting maps according to the driving resistance;

identifying a target gear of the transmission based on the selected shifting map, the vehicle speed, and the accelerator signal; and judging whether the target gear is equal to the current gear of the transmission with the vehicle control unit, with the vehicle control unit keeping executing the first power distribution law and maintaining the target gear of the transmission if the target gear is equal to the current gear, and with the vehicle control unit using a gear shifting driver to shift the current gear of the transmission to the target gear if the target gear is different from the current gear.

2. The method as claimed in claim 1, wherein the vehicle control unit uses the accelerator signal to decide the torque demand of the electric vehicle based on an expression showing a relationship between the torque demand and the accelerator signal as follows:

$$T_d = f(\alpha) \times T_{max}(V)$$

wherein $T_d$ is the torque demand, $\alpha$ is the accelerator signal, V is the vehicle speed, $f(\alpha)$ is a polynomial function of the accelerator signal α and is in a range between 0 and 1, $T_{max}(V)$ is a maximum torque output of the electric vehicle correponding to the vehicle speed.

3. The method as claimed in claim 2, wherein the power demand calculated from the torque demand is as follows:

$$P_d = T_d \times \omega_w$$

wherein $P_d$ is the power demand, $T_d$ is the torque demand, $\omega_w$ is a rotating speed of a driving wheel of the electric vehicle obtained from the vehicle speed.

4. The method as claimed in claim 1, wherein a relationship between the power demand and the powers outputted from the first and second motors is as follows:

$$P_d = P_{M1} + P_{M2}$$

wherein $P_d$ is the power demand of the electric vehicle, $P_{M1}$ is the output power of the first motor, and $P_{M2}$ is the output power of the second motor.

5. The method as claimed in claim 4, wherein the first power distribution law is as follows:

$$P_{M1} = a \times P_d, \; P_{M2} = (1-a) \times P_d$$

wherein $P_d$ is the power demand, $P_{M1}$ is the output power of the first motor, $P_{M2}$ is the output power of the second motor, a is the distribution ratio and is in a range between 0 and 1.

6. The method as claimed in claim 5, wherein the output powers of the first and second motors are as follows:

$$P_{M1} = T_{M1} \times \omega_1, \; P_{M2} = T_{M2} \times \omega_2$$

wherein $P_{M1}$ is the output power of the first motor, $P_{M2}$ is the output power of the second motor, $T_{M1}$ is the output torque of the first motor, $T_{M2}$ is the output torque of the second motor, $\omega_1$ is a rotating speed of the first motor obtained from the vehicle speed, and $\omega_2$ is a rotating speed of the second motor obtained from the vehicle speed.

7. The method as claimed in claim 6, wherein a total power consumed by the first and second motors is as follows:

$$P_{consum} = T_{M1} \times \omega_1 / \eta_{M1} + T_{M2} \times \omega_2 / \eta_{M2}$$

wherein $P_{consum}$ is the total power, $T_{M1}$ is the output torque of the first motor, $T_{M2}$ is the output torque of the second motor, $\omega_1$ is the rotating speed of the first motor, $\omega_2$ is the rotating speed of the second motor, $\eta_{M1}$ is an operational efficiency at an operation point where the first motor has the output torque $T_{M1}$ and the rotating speed $\omega_1$, and $\eta_{M2}$ is an operational efficiency at an operation point where the second motor has the output torque $T_{M2}$ and the rotating speed $\omega_2$.

8. The method as claimed in claim 7, wherein data of distribution ratios for minimizing the total power according to different vehicle speeds, every gear of the transmission, and different power demands is obtained in advance and stored in the vehicle control unit to construct the distribution ratio database.

9. The method as claimed in claim 1, wherein when the electric vehicle starts to accelerate from a still state, the distribution ratio increases as the vehicle speed increases.

10. The method as claimed in claim 9, wherein when the vehicle speed is zero, the power of the electric vehicle is completely supplied by the second motor such that the distribution ratio is zero, and the distribution ratio increases as the vehicle speed increases, gradually increasing a proportion of the power outputted from the first motor.

11. The method as claimed in claim 1, wherein the driving resistance calculated by using the vehicle load estimation algorithm includes rolling resistance, drag resistance, and gradient resistance and is expressed as follows:

$$L = \mu m g \cos\theta + \frac{1}{2} \rho A C_d V^2 + mg \sin\theta$$

wherein m is the mass of the electric vehicle, μ is a rolling resistance coefficient and is assumed as a constant, g is a gravitational acceleration, θ is a grade of a road on which the electric vehicle moves, ρ is an air density, A is a frontal area of the electric vehicle, and $C_d$ is a drag resistance coefficient.

12. The method as claimed in claim 11, wherein a relationship between the acceleration of the electric vehicle, a tractive force imparted to the driving wheel of the electric vehicle, and the driving resistance is expressed as follows:

$$\dot{V} = (F_t - F_a)\frac{1}{m} - g\sqrt{1+\mu^2}\sin(\theta+\psi)$$
$$= \left[F_t - F_a - g\sqrt{1+\mu^2}\right]\left[\begin{array}{c}1/m \\ \sin(\theta+\psi)\end{array}\right]$$

wherein $\dot{V}$ is the acceleration, $F_t$ is the tractive force, $$F_a = \frac{1}{2}\rho A C_d V^2, \quad \psi = \sin^{-1}\left(\frac{\mu}{\sqrt{1+\mu^2}}\right),$$

the mass of the electric vehicle and the grade of the road on which the electric vehicle moves are estimated by using an algorithm on the above expression and are used to calculate the driving resistance.

13. The method as claimed in claim 12, wherein the algorithm is a recursive least-square error method (RLSE).

14. The method as claimed in claim 1, wherein the vehicle control unit divides driving resistances on different grades into a plurality of load ranges according to a change in the vehicle speed, and driving forces outputted from the second motor at different gears of the transmission are used to design the shifting map in each of the plurality of load ranges.

15. The method as claimed in claim 14, wherein the shifting map is a table cross referencing the vehicle speed and the torque demand of the electric vehicle to the target gear of the transmission.

16. The method as claimed in claim 15, wherein after the vehicle control unit obtains the driving resistance to the electric vehicle based on the vehicle load estimation algorithm, a corresponding shifting map is selected according to a corresponding load range to which the driving resistance belongs.

17. The method as claimed in claim 1, wherein the vehicle control unit shifts the gear of the transmission according to a second power distribution law to distribute the power, and the first motor supplies the electric vehicle with the torque demand.

18. The method as claimed in claim 17, wherein the power demand of the electric vehicle is adjusted to be completely supplied by the first motor according to the second power distribution law and is expressed as follows:

$$P_{M1}=P_d, P_{M2}=0$$

wherein $P_d$ is the power demand of the electric vehicle, $P_{M1}$ is the output power of the first motor, and $P_{M2}$ is the output power of the second motor.

19. The method as claimed in claim 18, wherein after the second power distribution law is executed by the vehicle control unit, a gear shifting actuator is driven via the gear shifting driver to shift the current gear of the transmission into a neutral gear, and an electronic synchronization process is carried out to change the rotating speed of the second motor to a target rotating speed, and the gear shifting actuator is then driven via the gear shifting driver to shift the transmission to the target gear.

20. The method as claimed in claim 19, wherein the electronic synchronization process includes conversion of the rotating speed of the first motor into the target rotating speed based on a ratio of a first gear ratio at which the first motor transmits power to the transmission shaft to a second gear ratio at which the second motor transmits power to the transmission shaft via the transmission and includes adjustment of the rotating speed of the second motor to the target rotating speed by the vehicle control unit.

* * * * *